(12) United States Patent
Kugel

(10) Patent No.: US 7,173,343 B2
(45) Date of Patent: Feb. 6, 2007

(54) EMI ENERGY HARVESTER

(76) Inventor: Moshe Kugel, 544 Empire Blvd., Brooklyn, NY (US) 11225

( * ) Notice: Subject to any disclaimer, the term of this patent is extended or adjusted under 35 U.S.C. 154(b) by 13 days.

(21) Appl. No.: 11/044,083

(22) Filed: Jan. 28, 2005

(65) Prior Publication Data

US 2006/0170217 A1 Aug. 3, 2006

(51) Int. Cl.
- F02B 63/04 (2006.01)
- F03G 7/08 (2006.01)
- H02K 7/18 (2006.01)

(52) U.S. Cl. .................................. 290/1 R
(58) Field of Classification Search ............... 290/1 R; 324/260, 96; 73/643; 219/709
See application file for complete search history.

(56) References Cited

U.S. PATENT DOCUMENTS

| | | | | |
|---|---|---|---|---|
| 4,410,805 A | * | 10/1983 | Berley | 290/1 R |
| 4,926,037 A | * | 5/1990 | Martin-Lopez | 250/205 |
| 5,428,961 A | * | 7/1995 | Sakakibara et al. | 60/698 |
| 5,578,877 A | * | 11/1996 | Tiemann | 310/15 |
| 6,580,177 B1 | * | 6/2003 | Hagood, IV et al. | 290/1 R |
| 6,765,451 B2 | * | 7/2004 | Kim et al. | 333/12 |
| 6,781,249 B2 | * | 8/2004 | Holder et al. | 290/1 A |
| 6,969,920 B1 | * | 11/2005 | Severinghaus | 290/1 R |
| 7,009,315 B2 | * | 3/2006 | Takeuchi | 310/15 |
| 2002/0027263 A1 | * | 3/2002 | Anthony et al. | 257/659 |

OTHER PUBLICATIONS

Graf, Rudolf, Modern Dictionary of Electronics, Seventh Edition, Butterworth-Heinemann, pp. 243.*

* cited by examiner

Primary Examiner—Julio Gonzalez
(74) Attorney, Agent, or Firm—Dekel Patent Ltd.; David Klein

(57) ABSTRACT

An energy harvester and method for electrical energy harvesting from electromagnetic interference, generated by electrical wiring and/or an electrical appliance, by receiving electromagnetic field energy radiated by the electromagnetic interference and converting the electromagnetic field energy to an electrical current for powering an electrical device. The voltage associated with the electrical current may be increased in preparation for powering the electrical device. The electrical current may be stored in preparation for powering the electrical device.

9 Claims, 1 Drawing Sheet

EMI ENERGY HARVESTER

FIELD OF THE INVENTION

This invention relates generally to electrical power harvesting, and particularly to an EMI (electromagnetic interference) power harvester.

BACKGROUND OF THE INVENTION

Power conservation is important in many systems, such as but not limited to, wireless sensor networks (WSNs), which have low power requirements and low data rates. Long battery life (e.g., up to 10 years) is essential in such systems where line power is not available or if the system is mobile. However, in many applications, using and replacing batteries, even long-lived types, is impractical, involving such factors as hard-to-access locations, labor and replacement battery costs. Accordingly, solutions have been sought for harvesting or extracting electrical power from the environment.

One example of energy harvesting is that of harvesting power from ambient vibrations. Vibration harvesters can generate electricity from vibrations that are barely noticeable to the human touch. Commercially available vibration harvesters include the Energy Harvester made by Ferro Solutions. In an environment with vibrations at 28 Hz and 100 milli-G's, this harvester produces a power output of 9.3 mW. The power output scales linearly with increased vibration frequency and exponentially with increased g-force. When the electricity thus generated is not used immediately, it can be stored in a super capacitor. Another example is Continuum Control Corp.'s iPower energy harvesters, which can extract electric energy from mechanical vibrations, motion, or impact, and store it for use by wireless sensors or other electronic devices.

The patent literature also describes vibration harvesters. For example, U.S. Pat. No. 6,771,007 to Tanielian describes a piezoelectric device connected to a vibration source that converts vibration energy to electrical current. A plurality of pairs of oppositely polarized piezoelectric wafers deflect to produce an electrical current. Each pair of wafers are arranged back-to-back and electrically joined together. The wafers are connected to a set of micro-machined parts and form a cantilevered beam with a mass-weighted end whose movement is converted to electrical energy.

U.S. Pat. Nos. 5,934,882 to Olney and 6,407,484 to Oliver et al. also describe piezoelectric stacks and elements used as energy harvesters.

U.S. Pat. No. 6,433,465 to McKnight et al. describes an energy-harvesting device using electrostrictive polymers. The electrical response phenomenon of electrostrictive polymers is used to harvest electrical power from the movement of objects, e.g., human walking motion. The polymer material is incorporated into the soles of footwear and is either full- or partial-wave rectified and then if desired converted to a direct current (DC) voltage level for suitable battery charging and the like.

SUMMARY OF THE INVENTION

The present invention seeks to provide a novel electrical energy harvester that harvests energy from ambient EMI (electromagnetic interference), such as that generated form common house wiring (e.g., 50–60 Hz "hum"), as is described more in detail hereinbelow.

There is thus provided in accordance with an embodiment of the present invention a method for electrical energy harvesting, including harvesting electrical energy from electromagnetic interference, generated by electrical wiring and/or an electrical appliance, by receiving electromagnetic field energy radiated by the electromagnetic interference and converting the electromagnetic field energy to an electrical current for powering an electrical device. The voltage associated with the electrical current may be increased in preparation for powering the electrical device. The electrical current may be stored in preparation for powering the electrical device.

There is also provided in accordance with an embodiment of the present invention an energy harvester including a receiver adapted to receive electromagnetic field energy radiated by electromagnetic interference generated by at least one of electrical wiring and an electrical appliance, and to convert the electromagnetic field energy to an electrical current for powering an electrical device.

An electrical apparatus may be provided that includes an electric circuit powered by a battery and including a socket for receiving therein a battery, the socket being in electrical communication with the energy harvester.

BRIEF DESCRIPTION OF THE DRAWINGS

The present invention will be understood and appreciated more fully from the following detailed description, taken in conjunction with the drawing in which.

DETAILED DESCRIPTION OF EMBODIMENTS

Figure 1:
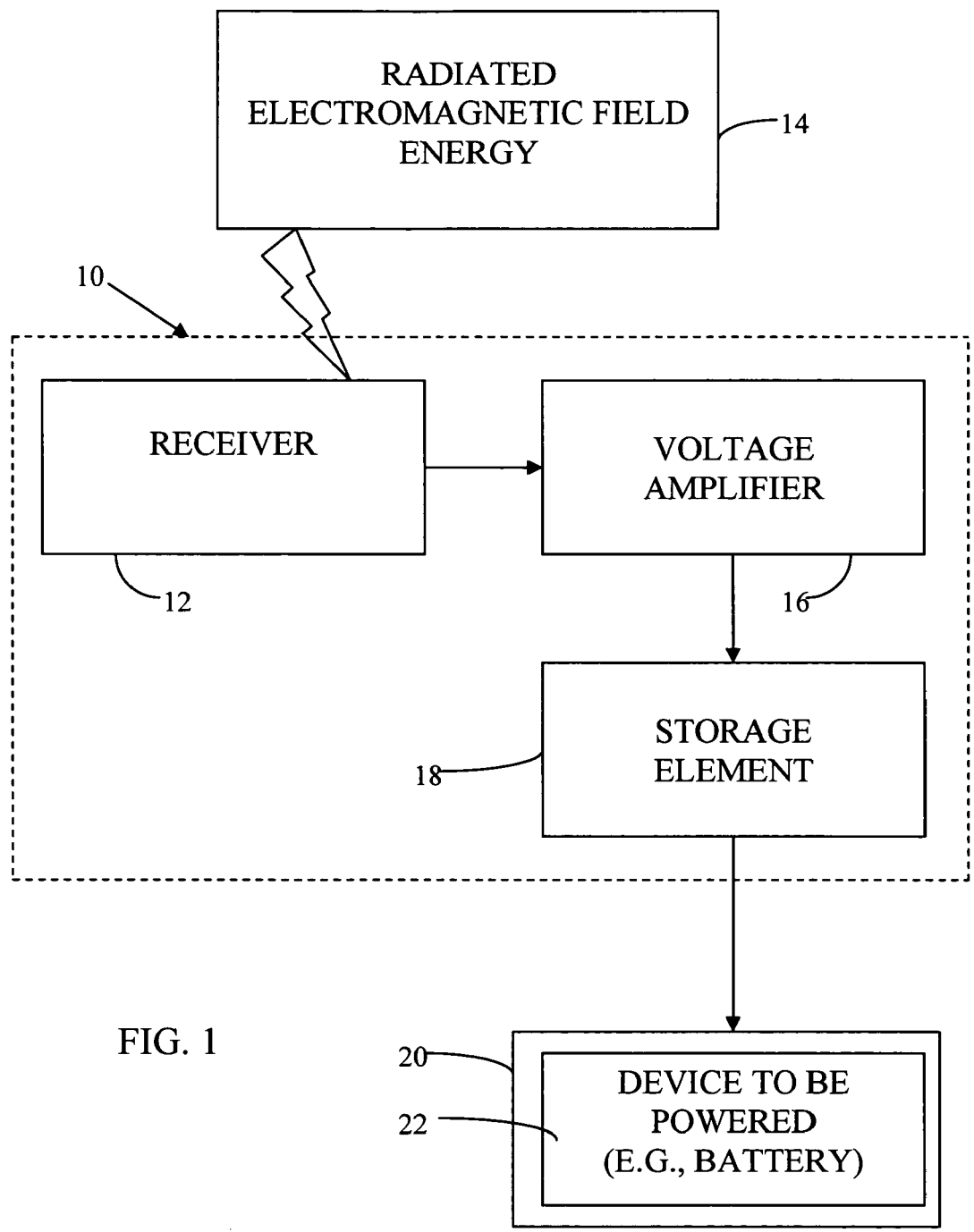
FIG. 1 is a simplified block diagram of an energy harvester, constructed and operative in accordance with an embodiment of the present invention.

Reference is now made to FIG. 1, which illustrates an energy harvester 10 used with an electrical appliance, in accordance with an embodiment of the present invention. The invention will first be explained in a very basic manner, and then a more detailed, non-limiting example will be described further hereinbelow.

The energy harvester 10 may include a receiver 12, capable of receiving electromagnetic field energy 14 radiated by electromagnetic interference, which may be generated by electrical wiring (e.g., "60 Hz hum") or by an electrical appliance (TV, radio, fax machine, refrigerator, computer, washing machine, etc.). Receiver 12 converts the electromagnetic field energy to an electrical current for powering an electrical device (e.g., for charging a battery). A non-limiting example of receiver 12 is a coil antenna.

As is well known in the art, electrical field strength (also referred to here as electromagnetic field strength) is the strength of a radiated electromagnetic field at a given location, measured in units of volts/meter with a field strength meter. The average field strength of EMI associated with "60 Hz hum" is about 3V/meter in the average home in the US.

A voltage amplification element 16, such as but not limited to, a transformer, may be in electrical communication with the receiver 12 for increasing the voltage associated with the electrical current coming from receiver 12. An electrical storage element 18, such as but not limited to, a capacitor, may store at least some of the electrical current prior to its being used to charge or power a device.

The following is a more detailed, non-limiting example of carrying out the invention.

One example of receiver 12 suitable for receiving the radiated electromagnetic field energy 14 is a receiver that includes loops of wire. In an experiment, four loops of wire were placed around the perimeter of a small room (approx 2.13 meters square), wherein 60 Hz EMI was present in the room. (Alternatively, receiver 12 may comprise a printed circuit board with a spiral antenna printed thereon.) A current of 3 mV AC was measured coming out of receiver 12. The loops of receiver 12 were connected to the primary of a transformer (voltage amplification element 16) which raised the voltage to 7 mV AC. The secondary of the transformer was connected to a germanium diode rectifier bridge and measured 6 mV DC. The DC side of the rectifier bridge was connected to a 10 μF capacitor, which charged up to 6 mV in about 10 seconds. In another experiment, the DC side of the rectifier bridge was connected to a 3300 μF capacitor, which charged up in about 10 minutes.

The above circuitry may be used to trickle charge a battery of an appliance (e.g., a PDA and prevent it from losing data, a cell phone battery, or a component in wireless sensor networks and many others). As seen in FIG. 1, the energy harvester 10 may be connected to a socket 20 for receiving therein a battery 22. The electrical current generated by the energy harvester 10 may flow to socket 20 for charging battery 22. Other non-limiting examples of applications for the invention include illuminating mailboxes or keyholes in dark hallways, small paintings in museums and homes without running power lines or changing batteries.

Another non-limiting example of voltage amplification element 16 is an audio transformer that boosts the AC voltage to about 15 mV. The output of the transformer may be connected to a diode bridge and converted to DC. It has been found that connecting the transformer to two diode bridges whose outputs are connected in series doubles the DC voltage. It has been found that the forward voltage drop across a diode (usually around 200 mV) does not come into effect at such low voltages. The net effect is an output of 28 mV DC to charge a capacitor.

One known way of boosting DC voltage is by using a multistage voltage doubler which is a combination of diodes and capacitors. This may not be so effective in the above example due to losses inherent in diodes at increasing voltages.

A non-limiting solution to the diode problem is to charge capacitors connected in parallel. For example, ten capacitors were connected in parallel to 28 mV, and a switching network was used to re-wire the 10 capacitors in series. This increased the voltage to 90 mV DC without using diodes. A commercially available integrated switching network may be used to accomplish this, such as but not limited to, the switching networks available from Maxim Integrated Products, 120 San Gabriel Drive, Sunnyvale, Calif. 94086. Capacitor networks are commercially available from such manufacturers as Reliable Electronics Manufacturing, 1203 E. Warner Ave. Santa Ana, Calif. 92705.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A method for electrical energy harvesting, comprising: harvesting undirected and unwanted electrical energy from electromagnetic interference generated by at least one of electrical wiring and an electrical appliance by receiving electromagnetic field energy radiated by the electromagnetic interference and converting the electromagnetic field energy to an electrical current for powering an electrical device.

2. The method according to claim 1, further comprising increasing a voltage associated with the electrical current in preparation for powering the electrical device.

3. The method according to claim 1, further comprising storing the electrical current in preparation for powering the electrical device.

4. An energy harvester comprising: a receiver adapted to receive undirected and unwanted electromagnetic field energy radiated by electromagnetic interference generated by at least one of electrical wiring and an electrical appliance, and to convert the electromagnetic field energy to an electrical current for powering an electrical device.

5. The energy harvester according to claim 4, further comprising a voltage amplification element adapted to increase a voltage associated with said electrical current.

6. The energy harvester according to claim 4, further comprising an electrical storage element adapted to store at least a portion of said electrical current.

7. An electrical apparatus comprising: a battery and a socket for receiving therein said battery, said socket being in electrical communication with an energy harvester that comprises a receiver adapted to receive undirected and unwanted electromagnetic field energy radiated by electromagnetic interference generated by at least one of electrical wiring and an electrical appliance, said receiver being adapted to convert the electromagnetic field energy to an electrical current that flows to said socket for charging the battery.

8. The electrical apparatus according to claim 7, further comprising a voltage amplification element adapted to increase a voltage associated with said electrical current.

9. The electrical apparatus according to claim 7, further comprising an electrical storage element adapted to store at least a portion of said electrical current.

* * * * *